(12) United States Patent
Feng et al.

(10) Patent No.: US 11,689,110 B2
(45) Date of Patent: Jun. 27, 2023

(54) AC VOLTAGE REGULATING CIRCUIT AND METHOD AND TRANSFORMER

(71) Applicants: Yongsong Zhang, Guangdong (CN); Shaohui Feng, Guangdong (CN)

(72) Inventors: Shaohui Feng, Guangdong (CN); Yongsong Zhang, Guangdong (CN); Zankang Zhang, Guangdong (CN)

(73) Assignees: Yongsong Zhang, Guangdong (CN); Shaohui Feng, Guangdong (CN)

( * ) Notice: Subject to any disclaimer, the term of this patent is extended or adjusted under 35 U.S.C. 154(b) by 186 days.

(21) Appl. No.: 17/361,341

(22) Filed: Jun. 29, 2021

(65) Prior Publication Data

US 2022/0255440 A1    Aug. 11, 2022

(30) Foreign Application Priority Data

Feb. 5, 2021    (CN) .......................... 202110170130.X

(51) Int. Cl.
*H02M 3/335*    (2006.01)
*H02M 1/08*    (2006.01)

(52) U.S. Cl.
CPC ......... *H02M 3/33569* (2013.01); *H02M 1/08* (2013.01)

(58) Field of Classification Search
CPC .... H02M 3/33569; H02M 1/10; H02M 5/458; H02M 7/53871
See application file for complete search history.

(56) References Cited

U.S. PATENT DOCUMENTS 10,291,111 B1*  5/2019  Rosado ................... H02M 1/10
2021/0336549 A1* 10/2021  Karakama ............... H02M 1/12

* cited by examiner

*Primary Examiner* — Kyle J Moody
(74) *Attorney, Agent, or Firm* — JCIP Global Inc.

(57) ABSTRACT

An AC voltage regulating circuit, method and transformer are disclosed in the present application. The AC voltage regulating circuit includes an AC/DC converter, a switch converter, and a switch controller. The AC/DC converter includes an AC power supply input end and a DC conversion output end. The switch converter includes a switch AC input end, a switch DC input end, a regulated voltage output end, an AC controllable switch assembly, a positive voltage DC controllable switch assembly and a negative voltage DC controllable switch assembly. The switch controller includes a power sampling end, a reference sampling end, an AC control end, a DC positive voltage control end and a DC negative voltage control end.

12 Claims, 4 Drawing Sheets

AC VOLTAGE REGULATING CIRCUIT AND METHOD AND TRANSFORMER

CROSS-REFERENCE TO RELATED APPLICATION

The application claims the priority benefit of China patent application serial No. 202110170130.X filed on Feb. 5, 2021. The entirety of the above-mentioned patent application is incorporated herein by reference and made a part of this specification.

BACKGROUND

Technical Field

The application relates to the technical field of alternating current (AC) voltage regulation, in particular to an AC voltage regulating circuit, method and transformer.

Description of Related Art

An AC voltage regulating circuit is widely used in practice. The current voltage regulating methods mainly include power frequency transformer voltage regulation, high frequency inverter voltage regulation, autotransformer voltage reduction and thyristor phase control voltage regulation.

Three of these methods, that is, power frequency transformer voltage regulation, high frequency inverter voltage regulation and autotransformer voltage reduction, will result in a rapid increase of volume of voltage regulator with the increase of output power, not convenient for carrying.

Thyristor phase control voltage regulation adopts the principle of thyristor chopping. By controlling the conduction angle of thyristor (thyristor), part of the input sine wave voltage of power grid is chopped, so as to decrease the average value of output voltage and achieve the purpose of voltage regulation. It has a low conversion efficiency.

In the above related technologies, there is a deficiency that small volume and high conversion rate cannot be achieved at the same time.

SUMMARY

In order to achieve both small volume and high conversion rate, the present application provides an AC voltage regulating circuit, method and transformer.

In a first aspect, the application provides an AC voltage regulating circuit, which adopts the following technical solution:

An AC voltage regulating circuit includes:

an AC/DC converter, including an AC power supply input end and a DC (direct current) conversion output end, in which the AC power supply input end is used for connecting an AC power supply;

a switch converter, including a switch AC input end, a switch DC input end, a regulated voltage output end, an AC controllable switch assembly, a positive voltage DC controllable switch assembly and a negative voltage DC controllable switch assembly. The switch AC input end is used for connecting the AC power supply, and the switch DC input end is used for acquiring a voltage regulated DC output from a DC output end of the AC/DC converter;

the AC controllable switch assembly is connected to a path between the AC input end and the regulated voltage output end, and when the AC controllable switch assembly is on, the regulated voltage output end outputs an AC power supply input from the switch AC input end;

the positive voltage DC controllable switch assembly is connected between the switch DC input end and the regulated voltage output end, and when the positive voltage DC controllable switch assembly is on, the regulated voltage output end outputs positive voltage regulated DC;

the negative voltage DC controllable switch assembly is connected between the switch DC input end and the regulated voltage output end, and when the negative voltage DC controllable switch assembly is on, the regulated voltage output end outputs negative voltage regulated DC;

a switch controller, including a power sampling end used for connecting the AC power supply, a reference sampling end used for acquiring voltage regulated DC voltage, an AC control end connected to a control end of the AC controllable switch assembly, a DC positive voltage control end connected to a control end of the positive voltage DC controllable switch assembly and a DC negative voltage control end connected to a control end of the negative voltage DC controllable switch assembly.

In some embodiments, the switch controller compares the voltage values of the AC power supply and the voltage regulated DC during the positive half cycle of the AC power supply, to send an opening signal to the AC control end or the DC positive voltage control end, so that one of the AC power supply and the positive voltage regulated DC having a lower voltage value is output from the regulated voltage output end.

In some other embodiments, the switch controller compares the voltage values of the AC power supply and the voltage regulated DC during the negative half cycle of the AC power supply, so as to send an opening signal to the AC control end or the DC negative voltage control end, so that one of the AC power supply and the negative voltage regulated DC having a lower absolute value of voltage is output from the regulated voltage output end.

In the above technical solution, in an actual voltage regulation process, firstly the voltage of voltage regulated DC which is less than the amplitude voltage of the AC power supply is calculated according to an output demand; and secondly, according to this technical solution, the switch converter is controlled by the switch controller so that the switch converter outputs one of the AC power supply and the positive voltage regulated DC voltage having a lower voltage value in the positive half cycle, and outputs one of the AC power supply and the negative voltage regulated DC voltage having a lower absolute value of voltage. Therefore, the average voltage output from the regulated voltage output end is less than the original voltage source, and the total value of voltage in each of the cycles will remain unchanged, providing stable average value of voltage. Further, there is no chopping in the whole cycle, and there is no sudden change of voltage in the whole cycle. Finally, the control for the whole technical solution merely needs to compare the voltage values in the positive and negative cycles, achieving a simple whole logic control, small amount of calculation for control, and low cost of control.

Compared with the existing AC/AC converter, the present circuit needs fewer components and smaller volume, while achieving higher conversion rate, for example, 90% or above.

In some embodiments, the DC conversion output end includes a positive voltage output pin and a GND pin; and the regulated voltage output end includes a voltage regulating live wire pin and a voltage regulating neutral wire pin;

the positive voltage DC controllable switch assembly includes a positive voltage positive switch connected to a path between the positive voltage output pin and the voltage regulating live wire pin, and a positive voltage negative switch connected to a path between the GND pin and the voltage regulating neutral wire pin;

the negative voltage DC controllable switch assembly comprises a negative voltage positive switch connected to a path between the GND pin and the voltage regulating live wire pin, and a negative voltage negative switch connected to a path between the positive voltage output pin and the voltage regulating neutral wire pin.

In the above technical solution, a positive voltage can be output by forward connecting the positive voltage output pin and the GND pin between the voltage regulating live wire pin and the voltage regulating neutral wire pin; and, similarly, negative voltage can be output by reverse connection. Therefore, positive and negative voltage output can be achieved by providing two groups of switch assemblies, even when only two pins are provided at the DC conversion output end.

In some embodiments, the DC conversion output end includes a positive voltage output pin, a negative voltage output pin and a GND pin;

the regulated voltage output end includes a voltage regulating live wire pin and a voltage regulating neutral wire pin;

the positive voltage DC controllable switch assembly includes a positive voltage positive switch connected to path between the positive voltage output pin and the voltage regulating live wire pin and a positive voltage negative switch connected to a path between the GND pin and voltage regulating neutral wire pin;

the negative voltage DC controllable switch assembly includes a negative voltage positive switch connected to a path between the negative voltage output pin and the voltage regulating live wire pin and a negative voltage negative switch connected to a path between the GND pin and the voltage regulating neutral wire pin.

In the above technical solution, a positive voltage can be output by forward connecting the positive voltage output pin and the GND pin between the voltage regulating live wire pin and the voltage regulating neutral wire pin; and, similarly, negative voltage can be output by connecting the negative voltage output pin and the GND pin between the voltage regulating live wire pin and the voltage regulating neutral wire pin. Therefore, positive and negative voltage output can be achieved by providing two groups of switch assemblies.

In some embodiments, the regulated voltage output end includes a voltage regulating live wire pin and a voltage regulating neutral wire pin;

the AC controllable switch assembly includes a live wire switch and a neutral wire switch, the live wire switch is connected between the live wire of AC power supply and the voltage regulating live wire pin, and the neutral wire switch is connected between the neutral wire of the AC power supply and the voltage regulating neutral wire pin.

In the above technical solution, the output of AC power supply can be achieved by connecting the live wire of the AC power supply with the voltage regulating live wire pin and the neutral wire of the AC power supply with the voltage regulating neutral wire pin via the AC controllable switch assembly.

In some embodiments, the positive voltage positive switch, the positive voltage negative switch, the negative voltage positive switch, the negative voltage negative switch, the live wire switch and the neutral wire switch are power transistors.

In the above technical solution, the on/off control of power transistors can be realized through electrically controlled power transistors, so as to realize the switching cycle of AC power supply-to-positive voltage DC-to-AC power supply-to-negative voltage DC.

In some embodiments, the AC/DC converter includes a rectifier filter module and a PWM switch converter module, the AC power supply input end is provided on the rectifier filter module, the DC conversion output end is provided on the PWM switch converter module, and the rectifier filter module is configured to convert the AC power supply input at the AC power supply input end into filtered DC. The PWM switch converter module acquires the filtered DC and converts the filtered DC into the voltage regulated DC, which is output from the DC conversion output end.

In the above technical solution, the rectifier filter module can filter rectify AC into DC, and the PWM switch converter can realize the conversion of DC voltage through PWM control. Therefore, the conversion of AC/DC can be realized through the above two means.

In some embodiments, the PWM switch converter module is selected from the group consisting of a BUCK converter, a flyback converter, a forward converter, a two-transistor forward converter, a half bridge converter, a full bridge converter and a resonant converter.

In some embodiments, an auxiliary power supply is further included, and the output end of the auxiliary power supply is connected with a reference sampling end for outputting a reference voltage representing the voltage regulated DC voltage.

In the above technical solution, a reference voltage can be further provided by the auxiliary power supply in addition to the AC/DC converter.

In a second aspect, the present application provides an AC voltage regulating method, adopting the following technical solution.

An AC voltage regulating method includes:
converting an AC power supply to a voltage regulated DC;
acquiring and comparing voltage values of the AC power supply and voltage regulated DC; and
selecting the AC power supply, positive voltage regulated DC or negative voltage regulated DC as a voltage regulated power supply output based on comparison strategy;
in particular, the comparison strategy includes:
in the positive half cycle of the AC power supply, comparing voltage values of the AC power supply and voltage regulated DC, and selecting one of the AC power supply and the positive voltage regulated DC having a lower voltage value as the voltage regulated power supply output; and
in the negative half cycle of AC power supply, comparing voltage values of the AC power supply and voltage regulating DC, and selecting one of the AC power supply and the negative voltage regulated DC having a lower absolute value of voltage as the voltage regulated power supply output.

In the above technical solution, the switch converter outputs the one of the AC power supply and the positive voltage regulated DC voltage having a lower voltage value in the positive half cycle, and outputs the one of the AC power supply and the negative voltage regulated DC voltage having a lower absolute value of voltage, so that the total value of voltage in each of the two cycles will not change, providing stable average value of voltage. Further, there is no chopping in the whole cycle, and there is no sudden change of voltage in the whole cycle. Finally, the control for the whole technical solution merely needs to compare the voltage value of the positive and negative cycles, achieving a simple whole logic control, small amount of calculation for control, and low cost of control.

In a third aspect, the present application provides a transformer, which adopts the following technical solution:

a transformer including an AC voltage regulating circuit as described in the first aspect.

DESCRIPTION OF THE EMBODIMENTS

The present application will be further described below in detail in connection with FIGS. 1-6.

The embodiments of the present application disclose an AC voltage regulating circuit.

Embodiment 1

Figure 1:
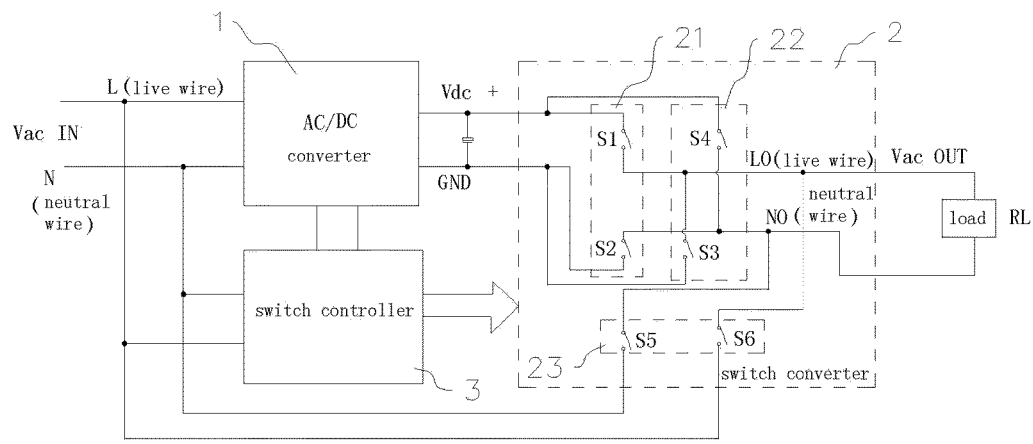
FIG. 1 is a schematic diagram of constitution of an AC voltage regulating circuit according to Embodiment 1.

Referring to FIG. 1, the AC voltage regulating circuit inputs AC power supply and outputs AC voltage regulated power after voltage conversion. The AC voltage regulating circuit includes an AC/DC converter 1, a switch converter 2 and a switch controller 3. In particular, the AC/DC converter 1 is configured to convert acquired AC power supply into voltage regulated DC; the switch converter 2 acquires AC power supply, positive voltage regulated DC and negative voltage regulated DC, respectively, and selects one of them as a voltage regulated power supply output; and the switch controller 3 controls the switch converter 2 to select AC power supply, positive voltage regulated DC or negative voltage regulated DC as a voltage regulated power supply output based on comparison strategy. In particular, the comparison strategy includes: in the positive half cycle of the AC power supply, comparing voltage values of the AC power supply and voltage regulated DC, selecting one of the AC power supply and the voltage regulated DC having a lower voltage value as an output of voltage regulated power supply; and in the negative half cycle of the AC power supply, comparing voltage values of the AC power supply and the voltage regulated DC, and selecting one of the AC power supply and the negative voltage regulated DC supply having a lower absolute value of voltage as an output of voltage regulated power supply.

The AC/DC converter 1 includes an AC power supply input end and a DC conversion output end. The AC input end is used for connecting the AC power supply, the DC conversion output end is used for connecting the input end of the switch converter 2, and the AC/DC converter 1 is configured to convert the AC power supply acquired from the AC input end into the voltage regulated DC which is output from the DC conversion output end.

Figure 2:
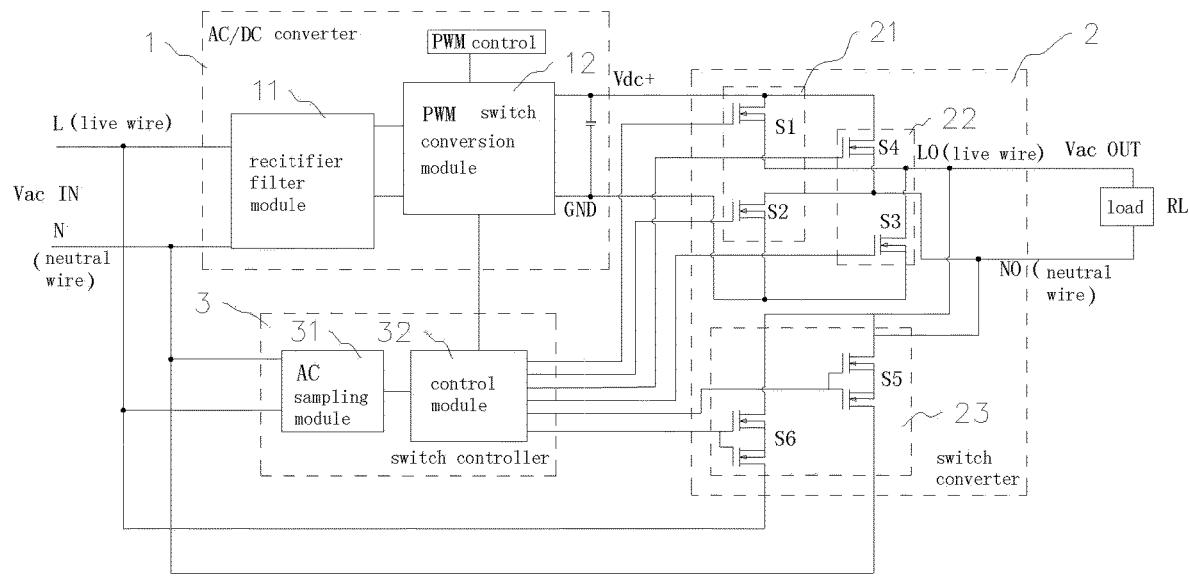
FIG. 2 is a schematic diagram of connection of an AC voltage regulating circuit according to Embodiment 1.

Specifically, referring to FIG. 2, the AC/DC converter 1 includes a rectifier filter module 11 and a PWM switch converter module 12. An AC power supply input end is provided on the rectifier filter module 11, a DC conversion output is provided on the PWM switch converter module 12, and the rectifier filter module 11 is configured to convert the AC power supply input from the AC power supply input end into filtered DC. The PWM switch conversion module 12 acquires the filtered DC and converts the filtered DC into voltage regulated DC, which is output from the DC conversion output end.

Referring to FIG. 2, the rectifier filter module 11 generally includes a rectifier bridge and a filter submodule. The rectifier bridge is connected to a neutral wire and a live wire of the AC power supply for rectifying the AC power supply. The filter submodule performs filtering after rectification, so that the output of the AC power supply is converted into filtered DC with stable voltage value. By means of PWM wave control, the PWM switch converter module 12 can realize the conversion of DC voltage, that is, voltage regulating and converting the filtered DC voltage into voltage regulated DC.

In particular, the PWM switch converter module 12 can be any one selected from the group consisting of a BUCK converter, a flyback converter, a forward converter, a two-transistor forward converter, a half bridge converter, a full bridge converter and a resonant converter.

Referring to FIG. 2, the switch converter 2 includes a switch AC input end, a switch DC input end, a regulated voltage output end, an AC controllable switch assembly 23, a positive voltage DC controllable switch assembly 21 and a negative voltage DC controllable switch assembly 22. The AC input end is used for connecting the AC power supply, and the switch DC input end is used for acquiring the voltage regulated DC output from the DC output end of the AC/DC converter 1. The AC controllable switch assembly 23 is connected to the path between the AC input end and the regulated voltage output end, and when the AC controllable switch assembly 23 is on, the regulated voltage output end outputs the AC power supply input from the switch AC input end. The positive voltage DC controllable switch assembly 21 is connected to the path between the switch AC input end and the regulated voltage output end, and when the positive voltage DC controllable switch module 21 is on, the regulated voltage output end outputs positive voltage DC. The negative voltage DC controllable switch assembly 22 is connected between the switch DC input end and the regulated voltage output end, and when the negative voltage DC controllable switch assembly 22 is on, the regulated voltage output end outputs negative voltage regulated DC.

The switch AC input end includes an AC live wire input pin and an AC neutral wire input pin. The switch DC input end includes a DC positive voltage positive input pin, a DC positive voltage negative input pin, a DC negative voltage positive input pin and a DC negative voltage negative input pin.

The DC conversion output end includes a positive voltage output pin for outputting voltage regulated positive DC and GND pin for outputting zero potential. The positive voltage output pin in the DC conversion output end is connected to the DC positive voltage positive input pin and the DC negative voltage negative input pin of the switch DC input end, respectively. The GND pins in the DC conversion output are connected to DC positive voltage negative input pin and DC negative voltage positive input pin of the switch DC input end, respectively. The live wire of the AC power supply is connected to an AC live wire input pin, and the neutral wire of the AC power supply is connected to an AC power supply neutral wire. It is to be noted that, the DC positive voltage positive input pin and the DC negative voltage negative input pin, the DC positive voltage negative input pin and the DC negative voltage positive input pin can be electrically connected together in the switch converter 2, respectively, so that the DC conversion output end and the switch DC input end can be electrically connected only with two wires.

Referring to FIG. 2, the AC controllable switch assembly 23 includes a live wire switch S6 and a neutral wire switch S5. The live wire switch S6 is connected between the AC live wire input pin and the voltage regulating live wire pin, and the neutral wire switch S5 is connected between the AC neutral wire input pin and the voltage regulating neutral wire pin.

The positive voltage DC controllable switch assembly 21 includes a positive voltage positive switch S1 connected to the path between the DC positive voltage positive input pin and the voltage regulating live wire pin and a positive voltage negative switch S2 connected to the path between the DC positive voltage negative input pin and the voltage regulating neutral wire pin. The negative voltage DC controllable switch assembly 22 includes a negative voltage positive switch S3 connected to the path between the DC negative voltage positive input pin and the voltage regulating live wire pin and a negative voltage negative switch S4 connected to the path between the DC negative voltage negative input pin and voltage regulating neutral wire pin.

The positive voltage positive switch S1, the positive voltage negative switch S2, the negative voltage positive switch S3, the negative voltage negative switch S4, the live wire switch S6 and the neutral wire switch S5 are power transistors. Specifically, they can be any one selected from the group consisting of a power triode, a field effect transistor, an IGBT, a thyristor and a solid state relay.

By using the above connection, when the AC controllable switch assembly 23 is closed, the positive voltage DC controllable switch assembly 21 and the negative voltage DC controllable switch assembly 22 are disconnected, and the regulated voltage output end outputs voltage of the AC power supply. When the positive voltage DC controllable switch assembly 21 is closed, the AC controllable switch assembly 23 and the negative voltage DC controllable switch assembly 22 are disconnected, and the regulated voltage output end outputs voltage of the positive voltage regulated DC. When the negative voltage DC controllable switch assembly 22 is closed, the AC controllable switch assembly 23 and the positive voltage DC controllable switch assembly 21 are disconnected, and the regulated voltage output end outputs voltage of the negative voltage regulated DC.

Referring to FIG. 2, the switch controller 3 includes a power sampling end for acquiring the voltage of the AC power supply, a reference sampling end for acquiring the voltage regulated DC voltage, an AC control end connected to a control end of the AC controllable switch assembly 23, a DC positive voltage control end connected to a control end of the positive voltage DC controllable switch assembly 21, and a DC negative voltage control end connected to a control end of the negative voltage DC controllable switch assembly 22.

Further, the switch controller 3 includes an AC sampling module 31 and a control module 32. A power supply sampling end is provided on the AC sampling module 31. The AC sampling module 31 is connected with the live wire of the AC power supply and the neutral wire of the AC power supply, for converting the voltage into DC voltage which is input to the control module 32. The control module 32 can be one selected from the group consisting of MCU, operation amplifier IC and comparator IC. The reference sampling end, the AC control end, the DC positive voltage control end and the DC negative voltage control end are all provided on the control module 32.

The reference sampling end is connected with the positive voltage output pin. The AC control ends are respectively connected with the control pins of the live wire switch S6 and the neutral wire switch S5. The DC positive voltage control ends are respectively connected with the control pins of the positive voltage positive switch S1 and the positive voltage negative switch S2. The DC negative voltage control ends are respectively connected with the control pins of the negative voltage positive switch S3 and the negative voltage negative switch S4.

In the positive half cycle of the AC power supply, the switch controller 3 compares the voltage values of the AC power supply and voltage regulated DC to send an opening signal to AC control end or DC positive voltage control end, so that one of the AC power supply and the positive voltage regulated DC having a lower voltage value is output from regulated voltage output end.

In the negative half cycle of the AC power supply, the switch controller 3 compares the voltage values of the AC power supply and the voltage regulated DC to send an opening signal to the AC control end or the DC negative voltage control end, so that the one of the AC power supply and negative voltage regulated DC having lower absolute value of voltage is output from the regulated voltage output end.

Figure 3:
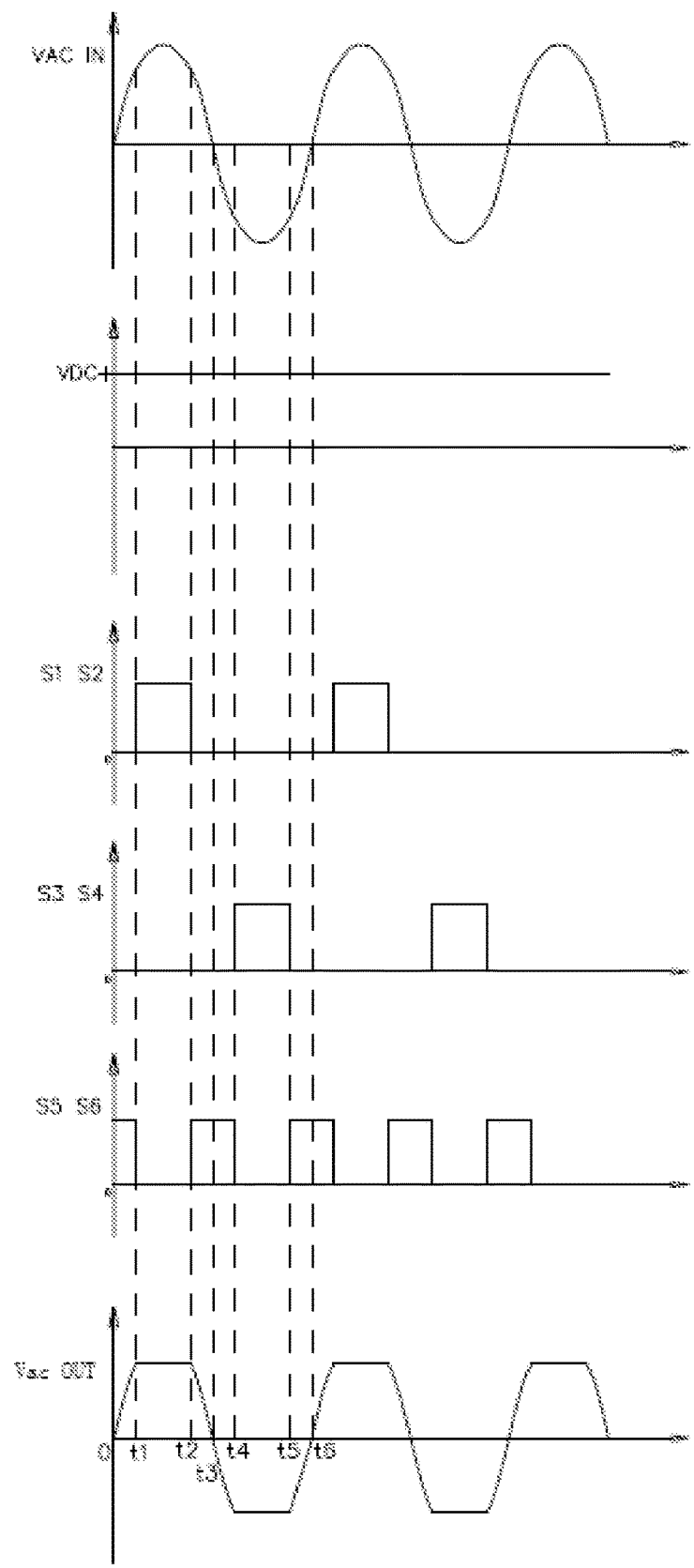
FIG. 3 is a waveform diagram of circuit timing and input and output voltage of an AC voltage regulating circuit.

A specific example is shown in FIG. 3, where AC input $V_{AC}$ IN is an AC power supply, DC Voltage VDC+ is a voltage regulated DC, and AC output $V_{AC}$ OUT is an AC output.

For the AC input $V_{AC}$ IN in positive half cycle:

1) At t0-t1, the switch controller 3 detects that the AC input $V_{ac}$ IN≤DC Voltage VDC+, and the switch controller 3 outputs a control signal to control the neutral wire switch S5 and live wire switch S6 to close, and control the positive voltage positive switch S1, the positive voltage negative switch S2, the negative voltage positive switch S3 and the negative voltage negative switch S4 to open. The AC input $V_{ac}$ IN is output as $V_{ac}$ OUT at the regulated voltage output end through the neutral wire switch S5 and the live wire switch S6.

2) At t1-t2, the switch controller 3 detects AC input $V_{ac}$ IN>DC Voltage VDC+, and the switch controller 3 outputs a control signal to control the positive voltage positive switch S1 and the positive voltage negative switch S2 to close, and control the negative voltage positive switch S3, the negative voltage negative switch S4, the neutral wire switch S5 and the live wire switch S6 to open. The DC Voltage VDC is output as AC output $V_{ac}$ OUT at the regulated voltage output end through the positive voltage positive switch S1 and the positive voltage negative switch S2.

3) At t2-t3, the switch controller 3 detects AC input $V_{ac}$ IN≤DC Voltage VDC+, and the switch controller 3 outputs a control signal to control the neutral wire switch S5 and the live wire switch S6 to close, and control the positive voltage positive switch S1, the positive voltage negative switch S2, the negative voltage positive switch S3 and the negative voltage negative switch S4 to open. The AC input $V_{ac}$ IN is output as AC output $V_{ac}$ OUT through the neutral wire switch S5 and the live wire switch S6.

For the AC input $V_{AC}$ IN in negative half cycle:

4) At t3-t4, the switch controller 3 detects the AC power supply $|V_{ac}\text{ IN}| \leq$ DC Voltage VDC+, and the switch controller 3 outputs a control signal to control the neutral wire switch S5 and live wire switch S6 to close, and control the positive voltage positive switch S1, the positive voltage negative switch S2, the negative voltage positive switch S3 and the negative voltage negative switch S4 to open. The AC input $V_{ac}$ IN is output as AC output $V_{ac}$ OUT at regulated voltage output end through the neutral wire switch S5 and the live wire switch S6.

5) At t4-t5, the switch controller 3 detects the AC power supply $|V_{ac}\text{ IN}|>$ DC Voltage VDC+, and the switch controller 3 outputs a control signal to control the negative voltage positive switch S3 and the negative voltage negative switch S4 to close, and control the positive voltage positive switch S1, the positive voltage negative switch S2, the neutral wire switch S5 and the live wire switch S6 to open. The DC Voltage VDC+ is output as AC output $V_{ac}$ OUT at the regulated voltage output end through the negative voltage positive switch S3 and the negative voltage negative switch S4.

6) At t5-t6, the switch controller 3 detects the AC power supply $|V_{ac}\text{ IN}| \leq$ DC Voltage VDC+, and the switch controller 3 outputs a control signal to control the neutral wire switch S5 and live wire switch S6 to close, and control the positive voltage positive switch S1, the positive voltage negative switch S2, the negative voltage positive switch S3 and the negative voltage negative switch S4 to open. An AC input is output as AC output $V_{ac}$ OUT at regulated voltage output end through the neutral wire switch S5 and the live wire switch S6.

In summary, the present application skillfully makes use of the switch converter 2 to combine AC input $V_{ac}$ IN with DC Voltage VDC+ to obtain stable voltage AC output $V_{ac}$ OUT at the AC output end, and the value of voltage AC output $V_{ac}$ OUT at the AC output end can be changed by changing the value of DC Voltage VDC+. Thereby, AC/AC voltage regulation conversion can be achieved. It has the advantages of stable output AC voltage, adjustability, high efficiency, energy saving, small volume and low cost.

Embodiment 2

Figure 4:
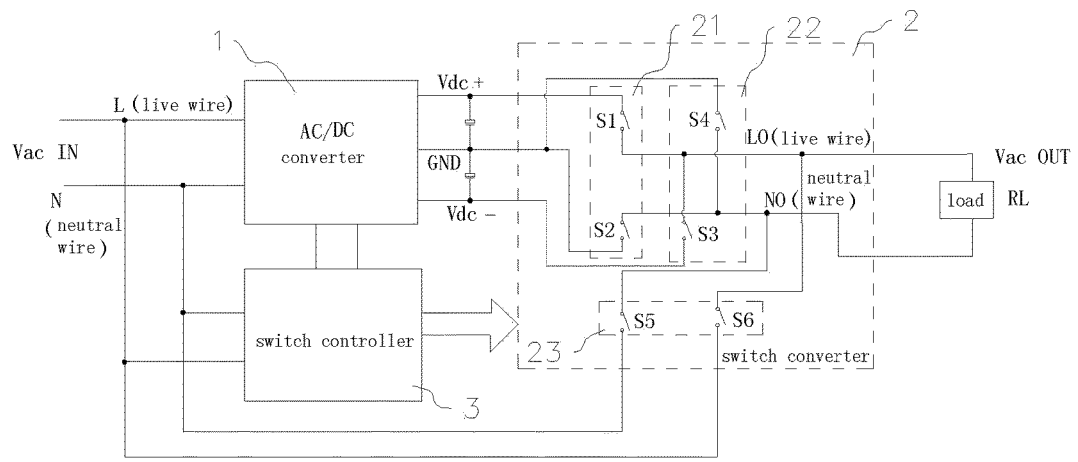
FIG. 4 is a schematic diagram of constitution of an AC voltage regulating circuit according to Embodiment 2.

As shown in FIG. 4, the only difference from Embodiment 1 is that the structure of the DC conversion output end is different. The DC conversion output end includes a positive voltage output pin, a negative voltage output pin and a GND pin. The positive voltage output pin in the DC conversion output end is connected with the DC positive voltage positive input pin in the switch DC input end, the negative voltage output pin in the DC conversion output end is connected with the DC positive voltage negative input pin in the switch DC input end, and the GND pin in the DC converter output end is connected to the DC positive voltage negative input pin and the DC negative voltage negative input pin in the switch DC input end, respectively. The live wire of the AC power supply is connected to the AC live wire input pin, and the live wire of the AC power supply is connected to the neutral wire of AC power supply. It is worth mentioning that the DC positive voltage negative input pin and the DC negative voltage negative input pin can be electrically connected together in the switch converter 2, so that the DC conversion output end and the switch DC input end can be electrically connected by using only three wires.

Embodiment 3

Figure 5:
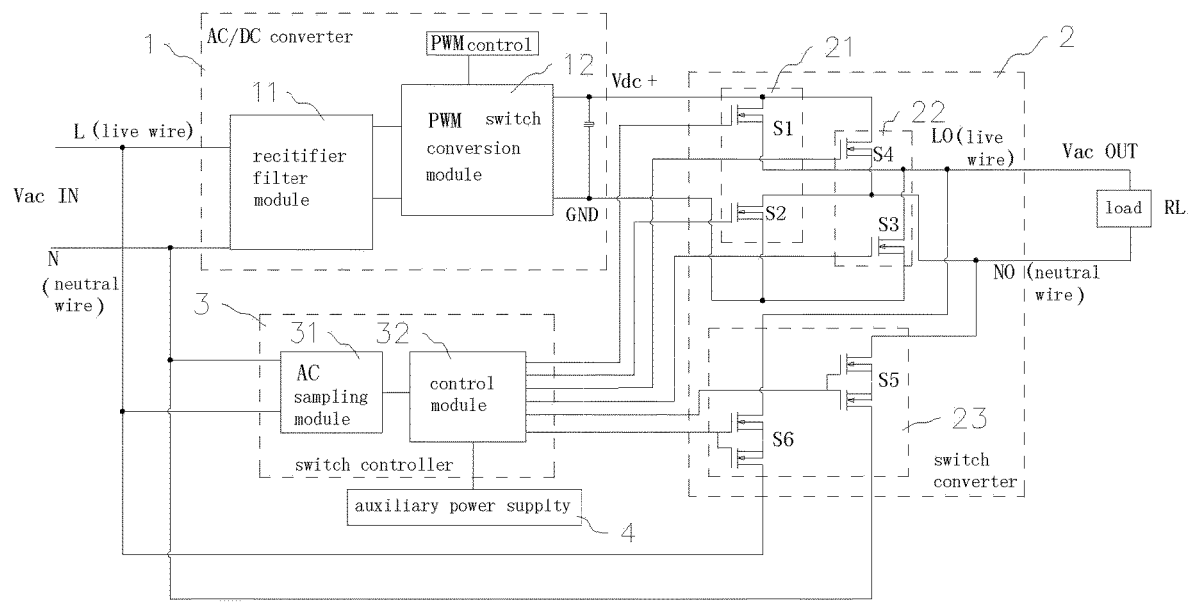
FIG. 5 is a schematic diagram of connection of an AC voltage regulating circuit according to Embodiment 3.

As shown in FIG. 5, the difference from Embodiment 1 only lies in the wiring mode of the reference sampling end of the control module 32 in the switch controller 3.

The AC voltage regulating circuit is further provided with an auxiliary power supply 4. The reference sampling end is connected with the auxiliary power supply 4. Because the voltage value of the regulated DC is a calculated definite value, the auxiliary power supply 4 can output a reference voltage representing the voltage regulated DC voltage. The reference voltage can be equal to or proportional to the voltage of the voltage regulated DC. When the reference voltage is proportional to the voltage of the voltage regulated DC, the switch controller 3 calculates the voltage of the voltage regulated DC based on the voltage value of the reference voltage.

An embodiment of the present application discloses an AC voltage regulating method. It is applied to the AC voltage regulating circuit disclosed in the above embodiments.

Figure 6:
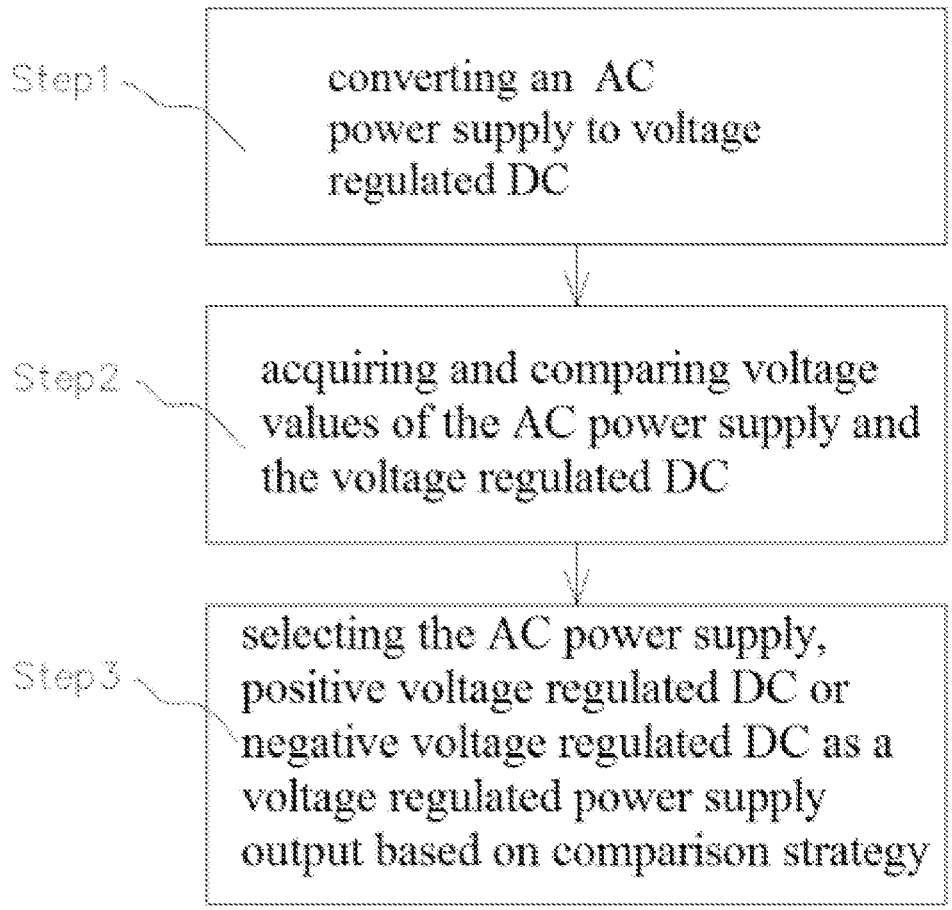
FIG. 6 is a flow chart of an AC voltage regulating method.

An AC voltage regulating method, as shown in FIG. 6, includes:

Step 1. converting an AC power supply to a voltage regulated DC;

Step 2. acquiring and comparing voltage values of the AC power supply and voltage regulated DC;

Step 3. selecting the AC power supply, positive voltage regulated DC or negative voltage regulated DC based on comparison strategy as an output of a voltage regulated power supply.

In particular, the comparison strategy includes:

in the positive half cycle of the AC power supply, comparing voltage values of the AC power supply and voltage regulated DC, and selecting one of the AC power supply and the positive voltage regulated DC having a lower voltage value as an output of the voltage regulated power supply; and in the negative half cycle of AC power supply, comparing voltage values of the AC power supply and voltage regulating DC, and selecting one of the AC power supply and the negative voltage regulated DC having a lower absolute value of voltage as the output of the voltage regulated power supply.

A transformer is disclosed in an embodiment of the present application, which includes the AC voltage regulating circuit disclosed in the above embodiment. In particular, the input AC power supply voltage of the transformer is 200-240V, and the voltage of the output AC voltage regulated power supply is 115V.

All the above embodiments are exemplary embodiments of the present application, and the scope of protection of the present application is not limited thereto. Therefore, all equivalent changes made according to the structure, shape and principle of the present application shall be included in the scope of protection of the present application.

What is claimed is:

1. An AC voltage regulating circuit, comprising:
 an AC/DC converter, comprising an AC power supply input end and a DC conversion output end, wherein the AC power supply input end is used for connecting an AC power supply;
 a switch converter, comprising a switch AC input end, a switch DC input end, a regulated voltage output end, an AC controllable switch assembly, a positive voltage DC controllable switch assembly and a negative voltage DC controllable switch assembly, wherein the switch AC input end is used for connecting the AC power supply, and the switch DC input end is used for acquiring a voltage regulated DC output from a DC output end of the AC/DC converter;

wherein the AC controllable switch assembly is connected to a path between the switch AC input end and the regulated voltage output end, and when the AC controllable switch assembly is on, the regulated voltage output end outputs an AC power supply input from the switch AC input end;

wherein the positive voltage DC controllable switch assembly is connected between the switch DC input end and the regulated voltage output end, and when the positive voltage DC controllable switch assembly is on, the regulated voltage output end outputs positive voltage regulated DC;

wherein the negative voltage DC controllable switch assembly is connected between the switch DC input end and the regulated voltage output end, and when the negative voltage DC controllable switch assembly is on, the regulated voltage output end outputs negative voltage regulated DC; and a switch controller, comprising a power sampling end used for connecting the AC power supply, a reference sampling end used for acquiring voltage regulated DC voltage, an AC control end connected to a control end of the AC controllable switch assembly, a DC positive voltage control end connected to a control end of the positive voltage DC controllable switch assembly and a DC negative voltage control end connected to a control end of the negative voltage DC controllable switch assembly.

2. The AC voltage regulating circuit according to claim 1, wherein the switch controller compares voltage values of the AC power supply and the voltage regulated DC during a positive half cycle of the AC power supply, to send an opening signal to the AC control end or the DC positive voltage control end, so that one of the AC power supply and the positive voltage regulated DC having a lower voltage value is output from the regulated voltage output end; and the switch controller compares voltage values of the AC power supply and the voltage regulated DC during a negative half cycle of the AC power supply, so as to send an opening signal to the AC control end or the DC negative voltage control end, so that one of the AC power supply and the negative voltage regulated DC having a lower absolute value of voltage is output from the regulated voltage output end.

3. The AC voltage regulating circuit according to claim 1, wherein the DC conversion output end comprises a positive voltage output pin and a GND pin; and the regulated voltage output end comprises a voltage regulating live wire pin and a voltage regulating neutral wire pin;

the positive voltage DC controllable switch assembly comprises a positive voltage positive switch connected to a path between the positive voltage output pin and the voltage regulating live wire pin, and a positive voltage negative switch connected to a path between the GND pin and the voltage regulating neutral wire pin; and the negative voltage DC controllable switch assembly comprises a negative voltage positive switch connected to a path between the GND pin and the voltage regulating live wire pin, and a negative voltage negative switch connected to a path between the positive voltage output pin and the voltage regulating neutral wire pin.

4. The AC voltage regulating circuit according to claim 3, wherein the AC controllable switch assembly comprises a live wire switch and a neutral wire switch, the live wire switch is connected between the live wire of AC power supply and the voltage regulating live wire pin, and the neutral wire switch is connected between the neutral wire of the AC power supply and the voltage regulating neutral wire pin.

5. The AC voltage regulating circuit according to claim 4, wherein the positive voltage positive switch, the positive voltage negative switch, the negative voltage positive switch, the negative voltage negative switch, the live wire switch and the neutral wire switch are power transistors.

6. The AC voltage regulating circuit according to claim 1, wherein the DC conversion output end comprises a positive voltage output pin, a negative voltage output pin and a GND pin;

the regulated voltage output end comprises a voltage regulating live wire pin and a voltage regulating neutral wire pin;

the positive voltage DC controllable switch assembly comprises a positive voltage positive switch connected to path between the positive voltage output pin and the voltage regulating live wire pin and a positive voltage negative switch connected to a path between the GND pin and voltage regulating neutral wire pin; and the negative voltage DC controllable switch assembly comprises a negative voltage positive switch connected to a path between the negative voltage output pin and the voltage regulating live wire pin and a negative voltage negative switch connected to a path between the GND pin and the voltage regulating neutral wire pin.

7. The AC voltage regulating circuit according to claim 6, wherein the AC controllable switch assembly comprises a live wire switch and a neutral wire switch, the live wire switch is connected between the live wire of AC power supply and the voltage regulating live wire pin, and the neutral wire switch is connected between the neutral wire of the AC power supply and the voltage regulating neutral wire pin.

8. The AC voltage regulating circuit according to claim 1, wherein the AC/DC converter comprises a rectifier filter module and a PWM switch converter module, the AC power supply input end is provided on the rectifier filter module, the DC conversion output end is provided on the PWM switch converter module, and the rectifier filter module is configured to convert the AC power supply input at the AC power supply input end into filtered DC, and wherein the PWM switch converter module acquires the filtered DC and converts the filtered DC into the voltage regulated DC, and the voltage regulated DC is output from the DC conversion output end.

9. The AC voltage regulating circuit according to claim 8, wherein the PWM switch converter module is selected from the group consisting of a BUCK converter, a flyback converter, a forward converter, a two-transistor forward converter, a half bridge converter, a full bridge converter and a resonant converter.

10. The AC voltage regulating circuit according to claim 1, further comprising an auxiliary power supply, wherein the output end of the auxiliary power supply is connected with a reference sampling end for outputting a reference voltage representing the voltage regulated DC voltage.

11. A transformer comprising the AC voltage regulating circuit according to claim 1.

12. An AC voltage regulating method comprising:
converting an AC power supply to a voltage regulated DC;
acquiring and comparing voltage values of the AC power supply and voltage regulated DC; and
selecting the AC power supply, positive voltage regulated DC or negative voltage regulated DC as a voltage regulated power supply output based on comparison strategy;
wherein the comparison strategy comprises:
in a positive half cycle of the AC power supply, comparing voltage values of the AC power supply and voltage regulated DC, and selecting one of the AC power supply and the positive voltage regulated DC having a lower voltage value as the voltage regulated power supply output; and
in a negative half cycle of AC power supply, comparing voltage values of the AC power supply and voltage regulating DC, and selecting one of the AC power supply and the negative voltage regulated DC having a lower absolute value of voltage as the voltage regulated power supply output.

\* \* \* \* \*